(12) United States Patent
Herr

(10) Patent No.: US 9,421,679 B2
(45) Date of Patent: Aug. 23, 2016

(54) HAND-HELD POWER TOOL

(75) Inventor: Tobias Herr, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 780 days.

(21) Appl. No.: 13/320,174

(22) PCT Filed: Jun. 1, 2010

(86) PCT No.: PCT/EP2010/057644
§ 371 (c)(1),
(2), (4) Date: Jan. 25, 2012

(87) PCT Pub. No.: WO2010/149474
PCT Pub. Date: Dec. 29, 2010

(65) Prior Publication Data
US 2012/0111594 A1    May 10, 2012

(30) Foreign Application Priority Data

Jun. 26, 2009  (DE) ..................... 20 2009 017 422 U
Dec. 18, 2009  (DE) ......................... 10 2009 054 932

(51) Int. Cl.
B23B 45/16    (2006.01)
B25D 16/00    (2006.01)
B25F 5/00     (2006.01)
(Continued)

(52) U.S. Cl.
CPC .......... B25D 11/106 (2013.01); B23B 31/1207 (2013.01); B25D 16/00 (2013.01); *B25D 2250/331* (2013.01); *F16C 25/083* (2013.01); *F16C 35/061* (2013.01)

(58) Field of Classification Search
CPC ........ B25D 11/04; B25D 11/06; B25D 16/00; B25D 2250/331; B25D 2250/335; B25D 2216/0023; B25D 2216/0069; B25D 2216/0038; B23B 45/04; B23B 45/16; B23B 45/008; F16C 25/083
USPC ................... 173/13, 104, 118, 218, 216, 217; 384/517, 537
See application file for complete search history.

(56) References Cited

U.S. PATENT DOCUMENTS 2,696,569 A * 12/1954 Schumann ...................... 310/50
3,625,530 A    12/1971 Parsons
(Continued)

FOREIGN PATENT DOCUMENTS

DE    582 962    9/1933
DE    885641     8/1953
(Continued)

OTHER PUBLICATIONS

International Search Report, PCT International Application No. PCT/EP2010/057644, dated Sep. 15, 2010.

*Primary Examiner* — Gloria R Weeks
*Assistant Examiner* — Justin Citrin
(74) *Attorney, Agent, or Firm* — Norton Rose Fulbright US LLP

(57) ABSTRACT

In a hand-held power tool having a housing and a tool holder, which is disposed on a drive shaft that is rotationally mounted in at least one first and one second ball bearing, the first ball bearing having a first inner ring and the second ball bearing having a second inner ring, a spring element is disposed between the first inner ring and the second inner ring in order to prestress the first ball bearing with respect to the second ball bearing.

12 Claims, 2 Drawing Sheets

(51) Int. Cl.
  *B25D 11/10*  (2006.01)
  *B23B 31/12*  (2006.01)
  *F16C 35/06*  (2006.01)
  *F16C 25/08*  (2006.01)

(56) References Cited

U.S. PATENT DOCUMENTS

| | | | | |
|---|---|---|---|---|
| 3,777,825 A * | 12/1973 | Gullich | ......... | B25D 16/00 173/109 |
| 3,807,515 A | 4/1974 | Evans | | |
| 3,807,815 A | 4/1974 | Kasabian | | |
| 3,834,468 A * | 9/1974 | Hettich | ......... | B25D 16/00 173/109 |
| 4,325,436 A * | 4/1982 | Richter et al. | ......... | 173/13 |
| 4,400,995 A * | 8/1983 | Palm | ......... | B23B 45/008 173/164 |
| 4,824,298 A | 4/1989 | Lippacher et al. | | |
| 6,536,782 B2 | 3/2003 | Röhm | | |
| 7,134,509 B2 | 11/2006 | Rahm | | |
| 7,225,884 B2 * | 6/2007 | Aeberhard | ......... | 173/93.5 |
| 7,311,155 B2 * | 12/2007 | Chang | ......... | 173/104 |
| 7,455,122 B2 * | 11/2008 | Chen | ......... | 173/104 |
| 2004/0245005 A1 * | 12/2004 | Toyama | ......... | B25D 16/003 173/48 |
| 2007/0289760 A1 * | 12/2007 | Sterling et al. | ......... | 173/104 |
| 2008/0142237 A1 * | 6/2008 | Fuchs | ......... | 173/104 |
| 2010/0044063 A1 * | 2/2010 | Chen | ......... | 173/93.5 |

FOREIGN PATENT DOCUMENTS

| | | | |
|---|---|---|---|
| FR | 2381605 | 9/1978 | |
| FR | 2381605 A1 * | 9/1978 | ......... B25D 16/00 |
| JP | 4300112 | 7/2009 | |

* cited by examiner

HAND-HELD POWER TOOL

FIELD OF THE INVENTION

The present invention relates to a hand-held power tool having a housing and a tool holder which is disposed on a drive shaft that is rotationally mounted in at least one first and one second ball bearing, the first ball bearing having a first inner ring and the second ball bearing having a second inner ring.

BACKGROUND INFORMATION

Conventional hand-held power tools have a drive shaft in the form of a drive spindle, the first ball bearing being situated in the area of a gear unit assigned to the power tool, e.g., a planetary gear that is located in a gear housing and in whose area a spindle lock is provided, which is assigned to the drive spindle, and the second ball bearing being situated in the area of a tool holder assigned to the power tool. Felt rings are provided between the first and second ball bearings, in order to prevent a hard impact of the drive spindle into the spindle lock when switching off such a power tool. These felt rings are disposed on the drive spindle in such a way that, to generate a drag torque by way of the gear housing, a prestress is produced on the spindle to thus reduce noise and wear during operation of the power tool.

A disadvantage is that the felt rings are comparatively costly, and also lead to a disturbing frictional force during normal operation or no-load operation of the power tool. This may result in an undesirable reduction in the service life of the power tool.

SUMMARY

An object of the present invention is to provide a new hand-held power tool having a low-friction and cost-effective no-load design.

This objective may be achieved by providing an example hand-held power tool having a housing and a tool holder which is disposed on a drive shaft that is rotationally mounted in at least one first and one second ball bearing. The first ball bearing has a first inner ring and the second ball bearing has a second inner ring. A spring element is disposed between the first inner ring and the second inner ring in order to prestress the first ball bearing with respect to the second ball bearing.

Thus, the present invention makes it possible to provide a hand-held power tool in which the use of felt rings may be omitted by using an inexpensive spring element; in doing so, comparatively great running quietness being achieved during operation of the power tool.

According to one specific embodiment, the spring element is fixed in position on the first and second inner rings, in order to permit the spring element to rotate with the inner rings during rotation of the drive shaft.

Therefore, a low-friction and wear-free utilization, and thus a comparatively long service life of the spring element may be achieved.

The first ball bearing is preferably supported axially and radially immovably in the housing, and is disposed on the drive shaft in a sliding fit. The first ball bearing preferably has an outer ring, which is supported in a press fit in a clamping ring secured in the housing.

Thus, a stable and reliable mounting of the first ball bearing in the housing may be achieved in an easy manner.

The second ball bearing is preferably disposed axially immovably on the drive shaft, and is supported axially displaceably in the housing. The second ball bearing preferably has an outer ring, which is supported in a sliding fit in a ring-like element secured axially and radially immovably in the housing.

Thus, a stable and reliable mounting of the second ball bearing in the housing may be achieved in an easy manner.

According to one specific embodiment, the drive shaft is able to be propelled via a gear unit, the first ball bearing being disposed in the housing so that it is at least sectionally in the area of an end face of the gear unit facing an end face of the housing. The second ball bearing is preferably disposed in the housing so that it is at least sectionally in the area of an end face of the housing facing the tool holder.

The present invention therefore permits a simple and compact design of the power tool.

Preferably, a supporting element is provided for the axial support of the second ball bearing, in order to make it possible to limit an axial shift of the second ball bearing in the direction of the tool holder.

Thus, safe and reliable operation of the electric tool may be ensured in an easy manner.

According to one specific embodiment, a notched mechanism for impact generation for the drive shaft is formed between the second bearing and the tool holder.

Thus, the present invention permits a simple and compact design of the power tool, even when using an assigned notched mechanism.

BRIEF DESCRIPTION OF THE DRAWINGS

The present invention is explained in greater detail below on the basis of exemplary embodiments shown in the figures.

DETAILED DESCRIPTION OF EXAMPLE EMBODIMENTS

Figure 1:
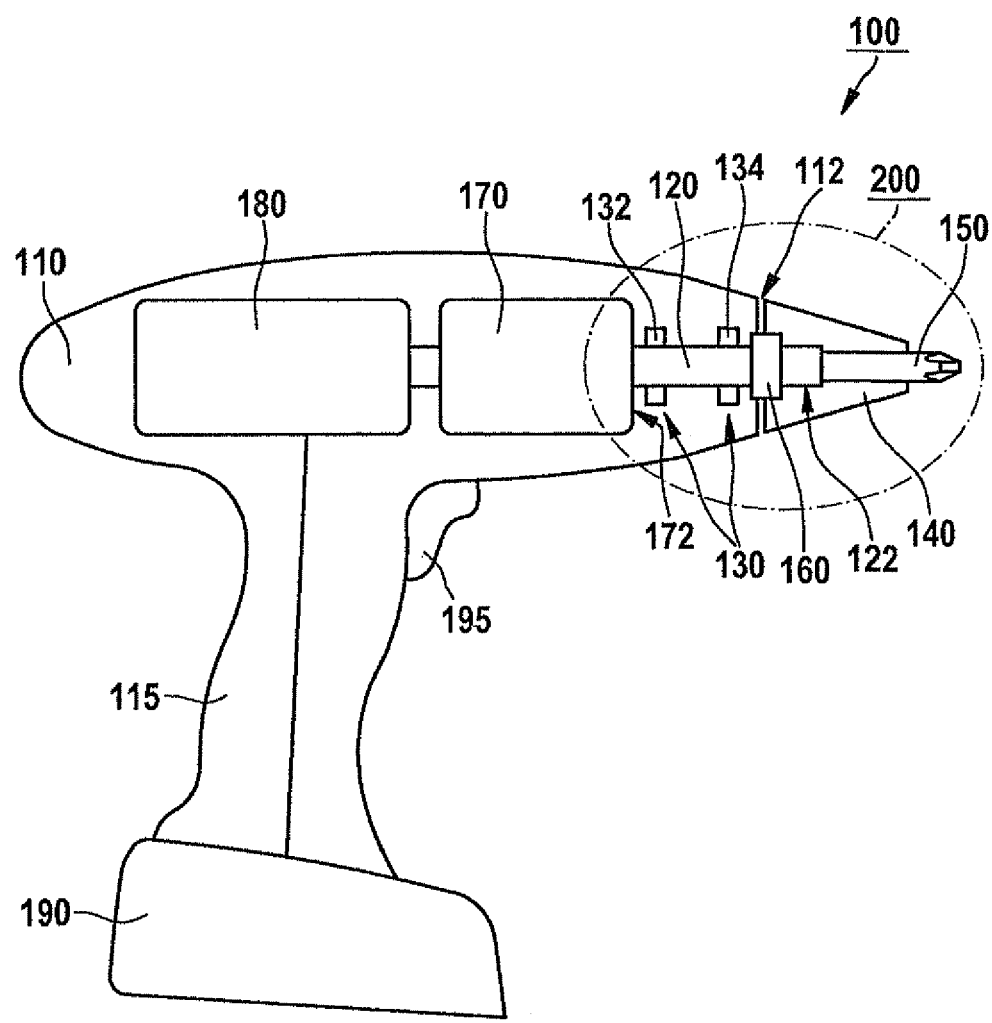
FIG. 1 shows a schematic view of a hand-held power tool according to a first specific embodiment.

FIG. 1 shows a hand-held power tool 100, which has a housing 110 having a grip 115. According to one specific embodiment, power tool 100 is connectable mechanically and electrically to a battery pack 190 for cordless power supply. By way of example, power tool 100 in FIG. 1 is in the form of a cordless drill/driver. However, it is stressed that the present invention is not limited to cordless drill/drivers, but rather may be used in various, especially battery-operated power tools in which a tool is set in rotation, e.g., in the case of a cordless screwdriver, a cordless impact drill, etc.

Disposed in housing 110 are an electric drive motor 180, supplied with current by battery pack 190, and a gear unit 170. Illustratively, drive motor 180 is operable, that is, is able to be switched on and off, via a manual switch 195, and may be any type of motor, e.g., an electronically commutated motor or a direct-current motor. Preferably, drive motor 180 is electronically controllable or regulable in such a way that both a reverse operation as well as setpoint selections with respect to a desired rotational speed are able to be realized. The functioning method and the design of a suitable drive motor are well known, so that a detailed description is dispensed with here in order to keep the specification concise.

Drive motor 180 is connected via gear unit 170 to a drive shaft 120. It is rotationally mounted in housing 110 by way of a bearing configuration 130, and is provided with a tool holder 140 situated in the area of an end face 112 of housing 110. Bearing configuration 130 may be attached to housing 110, e.g., via assigned fastening elements, or may be disposed in an assigned intermediate element, e.g., a separate gear housing in which gear unit 170 is situated, or a separate motor housing in which motor 180 and gear unit 170 are disposed, the gear housing and the motor housing, respectively, being located in housing 110. Tool holder 140 is used to receive a tool 150 and may be an integral part of drive shaft 120 or be joined to it in the form of an attachment. By way of example, in FIG. 1, tool holder 140 is attachment-like, and is secured to drive shaft 120 via a fastening device 122 provided on drive shaft 120.

According to one specific embodiment, bearing configuration 130 has a first bearing 134 and a second bearing 132 set apart from it. For example, first bearing 134 is situated at least sectionally in the area of end face 112 of housing 110, and hereinafter, is therefore also denoted as "tool-holder-side bearing." Second bearing 132, for example, is situated at least sectionally in the area of an end face 172 of gear unit 170 facing end face 112 of housing 110, and is therefore also denoted hereinafter as "gear-unit-side bearing."

According to one specific embodiment, a notched mechanism 160 is disposed between tool-holder-side bearing 134 and tool holder 140. During operation of power tool 100, this permits the realization of an impact operation, during which a percussive movement of drive shaft 120 is generated. Notched mechanism 160 is described in detail below with reference to a sectional view of a cut-away portion 200 shown enlarged in FIG. 2.

Figure 2:
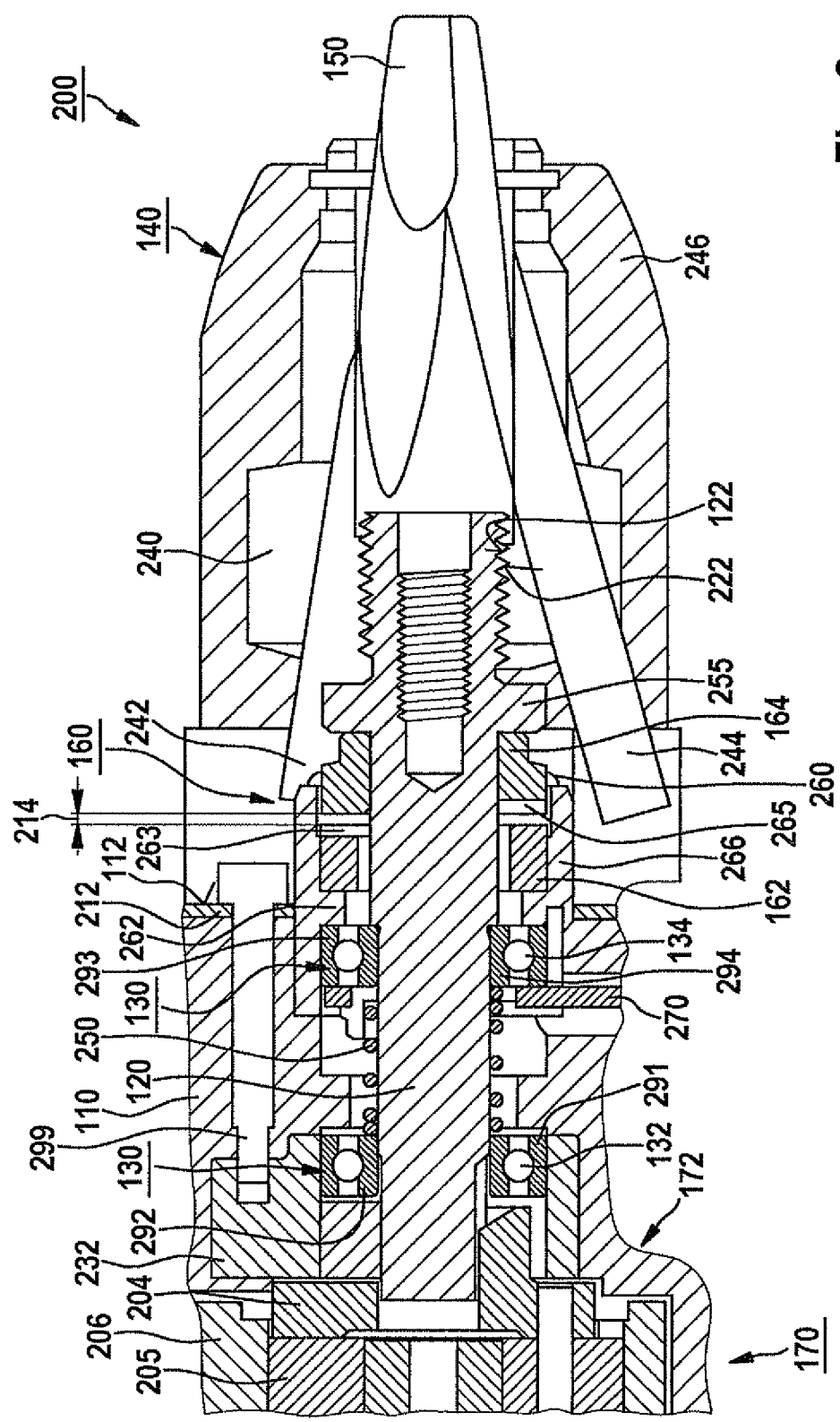
FIG. 2 shows an enlarged sectional view of a cut-away portion of the power tool from FIG. 1.

FIG. 2 shows cut-away portion 200 of hand-held power tool 100 from FIG. 1 in normal operation, that is, in drilling operation or screwing operation without impact generation, or in no-load operation of power tool 100. Cut-away portion 200 shows clearly an exemplary form of tool 150 and of tool holder 140, of gear unit 170, of bearing configuration 130 and of drive shaft 120, as well as of notched mechanism 160 for the impact generation for drive shaft 120 during impact operation of power tool 100.

By way of example, tool holder 140 has a drill chuck 240 which is attached to fastening device 122 of drive shaft 120. For example, fastening device 122 is formed as an external thread, which is engaged with an internal thread 222 provided on drill chuck 240. Moreover, drill chuck 240 has a predefined number of clamping members 242, 244, e.g., three or four, for clamping tool 150, as well as a clamping sleeve 246 which generally sheaths drill chuck 240. Tool 150 is turned by a rotation of drive shaft 120 during operation of power tool 100.

According to one specific embodiment, gear unit 170 is a planetary gear, formed with various gear steps or planetary steps, which is rotationally driven by drive motor 180 during operation of power tool 100. For instance, planetary gear 170 has an internal ring gear 206, at least one planet gear 205 as well as a driver 204, and transmits the torque of drive motor 180 via the planetary steps with the aid of a rotary driving contour of driver 204, to drive shaft 120.

As evident from FIG. 2, bearings 132, 134 of bearing configuration 130 provided for the mounting of drive shaft 120 are preferably in the form of ball bearings. For example, drive shaft 120 is formed as a drive spindle having a support flange 255, so that in the present exemplary embodiment, bearings 132, 134 are used as spindle bearings. However, it is stressed that other types of bearing are also usable within the scope of the present invention. For instance, alternatively, bearings 132, 134 may be implemented as friction bearings, drawn cup needle roller bearing with open ends, roller bearings or other types of rolling-contact bearings.

For example, gear-unit-side bearing 132 has an outer ring 291, as well as an inner ring 292, and is disposed axially and radially immovably in housing 110. Illustratively, outer ring 291 is joined by a press fit to a clamping ring 232 secured in housing 110. According to one specific embodiment, inner ring 292 is disposed in a sliding fit on drive spindle 120, so that spindle 120 is axially displaceable relative to bearing 132. By way of example, tool-holder-side bearing 134 has an outer ring 293, as well as an inner ring 294, and is disposed on drive spindle 120 in axially immovable fashion, e.g., in a press fit, via inner ring 294. As an alternative, bearing 134, i.e., its inner ring 294, may be integrally molded on drive spindle 120, and thus formed in one piece with it. Outer ring 293 is disposed in a sliding fit in a ring-like element 266, which is formed according to a type of retention sleeve and is secured axially and radially immovably in housing 110, that is, in the area of its end face 112. Therefore, bearing 134 is supported radially immovably in retention sleeve 266, but axially displaceably relative to it, and thus is supported in a sliding fit in housing 110.

According to one specific embodiment, bearing 134 is acted upon in the direction of drill chuck 240 by a spring element 250, e.g., a compression spring, situated between bearing 134 and gear-unit-side bearing 132. Thus, bearings 132, 134 are prestressed with respect to each other. Spring element 250 preferably abuts with its axial end areas against inner rings 292, 294 of bearings 132 and 134, respectively, and is therefore fixed in position on them in such a way that, during operation of power tool 100, spring element 250 rotates with the same speed as drive spindle 120 and inner rings 292, 294. Moreover, spring element 250 may also be secured to inner rings 292, 294.

Illustratively, notched mechanism 160 is situated between tool-holder-side bearing 134 and drill chuck 240 and, for example, has at least one first notched disk 164 secured to drive spindle 120 and at least one second notched disk 162 secured to housing 110. During impact operation of power tool 100 for the purpose of impact generation for drive shaft 120, notched disks 162, 164 are in operative engagement with each other via a front-side toothing 263 provided on notched disk 162 and a front-side toothing 265 provided on notched disk 164. During normal operation or no-load operation, toothings 263, 265 are set apart or separated from each other.

First notched disk 164 is secured axially and radially immovably on drive spindle 120, e.g., in a press fit, and illustratively, is supported on support flange 255. Alternatively, notched disk 164 may be integrally molded on drive spindle 120, and thus formed in one piece with it. According to one specific embodiment, first notched disk 164 is facing drill chuck 240, and is therefore also denoted hereinafter as "drill-chuck-side notched disk." Preferably, it is situated, at least sectionally, radially within clamping members 242, 244 and/or clamping sleeve 246.

Second notched disk 162 is joined to ring-like element 266; notched disk 162 may be secured to or integrally molded on ring-like element 266, or formed in one piece with it. Therefore, hereinafter, second notched disk 162 is also denoted as "gear-unit-side notched disk." Just like drill-chuck-side notched disk 164, it is preferably disposed outside of housing 110. For instance, end face 112 of housing 110 is formed by a plate-like fixation member 212, that is used to fix ring-like element 266 in position in or on housing 110. Illustratively, fixation member 212 is joined, e.g., screw-fitted, via a screw-like fastening element 299 to clamping ring 232 provided in housing 110, so that fixation member 212 and clamping ring 232 are fixed in position on housing 110 by element 299.

According to one specific embodiment, as described above, tool-holder-side bearing 134 is supported axially displaceably, but radially immovably in ring-like element 266, or in gear-unit-side notched disk 162. In order to limit an axial shift of bearing 134 in the direction of drill chuck 240, gear-unit-side notched disk 162 has a supporting element 262 for the axial support of bearing 134. It may likewise be formed from gear-unit-side notched disk 162, that is, be an integral component of it, or, as illustrated in FIG. 2, may also be integrally molded on retention sleeve 266.

In the direction of gear unit 170, an axial shift of bearing 134 may be blocked by a blocking member 270. Preferably, it is joined to an adjusting device, not shown for the purpose of clarity and simplicity of the illustration, with which, in particular, the normal operation or the impact operation of power tool 100 is selectively adjustable.

In order to seal off notched mechanism 160, a sealing element 260 is provided to protect it against grease loss, dirt and dust, and thus to prevent its functionality from being impaired. For instance, sealing element 260 may be in the form of a bellows, so that its air balance is not influenced in response to an axial shift of drill-chuck-side notched disk 164. In the same way, an O-ring, a radial shaft seal ring or a groove seal, that is, a seal formed by an air gap with axial extension, provided between notched disks 162, 164 may be used, so that a venting between drive spindle 120 and gear-unit-side notched disk 162, or between tool-holder-side bearing 134 and gear-unit-side notched disk 162 is made possible.

During normal operation, or during no-load of the impact operation of power tool 100, tool-holder-side bearing 134, and thus drive spindle 120, is pressed or pushed by compression spring 250 in the axial direction toward tool holder 140. In this context, according to one specific embodiment, during normal operation, bearing 134 is pressed against supporting element 262 and blocked by blocking member 270. Therefore, drive spindle 120 cannot be shifted in the direction of planetary gear 170, so that notched disks 162, 164 are set apart from each other by a predefined distance 214, and their front-side toothings 263, 265 can thus not be brought into operative engagement.

During impact operation of power tool 100, tool-holder-side bearing 134 is released axially by the release of blocking member 270, thus permitting an axial shift of drive spindle 120. In this context, by way of a pressure force exerted by a user on power tool 100, i.e., its housing 110, an axial shift of housing 110 relative to tool holder 140 against the force of spring element 250 may now be achieved to the extent that front-side toothings 263, 265 of notched disks 162 and 164, respectively, engage, and due to this operative engagement, impact generation is made possible for drive spindle 120. Impact generation of this kind is known sufficiently from the related art, so that in order to keep the specification concise, a detailed description is dispensed with here.

Since, as described above, spring element 250 acts upon tool-holder-side bearing 134 in the direction of drill chuck 240, this makes it possible to switch power tool 100 over to normal operation, or to operate in no-load of the impact operation. In order to switch over to normal operation, as described above, tool-holder-side bearing 134 is locked by blocking member 270 in an axial position assigned to the normal operation.

What is claimed is:

1. A hand-held power tool, comprising:
   a housing;
   a tool holder;
   a drive shaft that is rotationally mounted in at least one first and one second ball bearing, the first ball bearing having a first inner ring, and the second ball bearing having a second inner ring, the tool holder being disposed on the drive shaft, wherein the second ball bearing is disposed axially immovably on the drive shaft and is supported axially displaceably in the housing;
   a spring element that (a) is disposed between the first inner ring and the second inner ring in order to prestress the first ball bearing with respect to the second ball bearing, and (b) abuts against both of the first inner ring and the second inner ring such that the spring element rotates with the same speed as the first inner ring and the second inner ring during rotation of the drive shaft;
   a notched mechanism for impact generation for the drive shaft, the notched mechanism being situated between the second ball bearing and the tool holder; and
   a blocking member configured to block an axial shift of the second ball bearing and the drive shaft in a direction away from the tool holder in a drilling operation or screwing operation and to unblock an axial shift of the second ball bearing and the drive shaft in a direction away from the tool holder in an impact operation.

2. The power tool as recited in claim 1, wherein the spring element is fixed in position on the first inner ring and the second inner ring to permit the spring element to rotate with the first inner ring and the second inner ring during rotation of the drive shaft.

3. The power tool as recited in claim 2, wherein the spring element is fixed in position by a pre-stressing force.

4. The power tool as recited in claim 2, wherein the spring element is fixed in position by a connection to the first inner ring and the second inner ring.

5. The power tool as recited in claim 1, wherein the first ball bearing is supported axially and radially immovably in the housing and is disposed on the drive shaft in a sliding fit.

6. The power tool as recited in claim 5, wherein the first ball bearing has an outer ring that is supported in a press fit in a clamping ring secured in the housing.

7. The power tool as recited in claim 1, wherein the second ball bearing has an outer ring that is supported in a sliding fit in a ring-like element that is secured axially and radially immovably in the housing.

8. The power tool as recited in claim 7, wherein the notched mechanism includes a first notched disk which is secured axially and radially immovably on the drive shaft, and a second notched disk which is secured in an axially and radially immovable manner to the ring-like element.

9. The power tool as recited in claim 1, wherein the drive shaft is able to be propelled via a gear unit, the first ball bearing being disposed in the housing so that the first ball bearing is at least sectionally in an area of an end face of the gear unit facing an end face of the housing.

10. The power tool as recited in claim 1, wherein the second ball bearing is disposed in the housing so that the second ball bearing is at least sectionally in an area of an end face of the housing facing the tool holder.

11. The power tool as recited in claim 1, further comprising:
    a supporting element for axially supporting the second ball bearing to make it possible to limit an axial shift of the second ball bearing in a direction of the tool holder.

12. The power tool as recited in claim 1, wherein the notched mechanism includes a first notched disk which is secured axially and radially immovably on the drive shaft, and a second notched disk which is secured axially and radially immovably relative to the housing.

\* \* \* \* \*